UNITED STATES PATENT OFFICE.

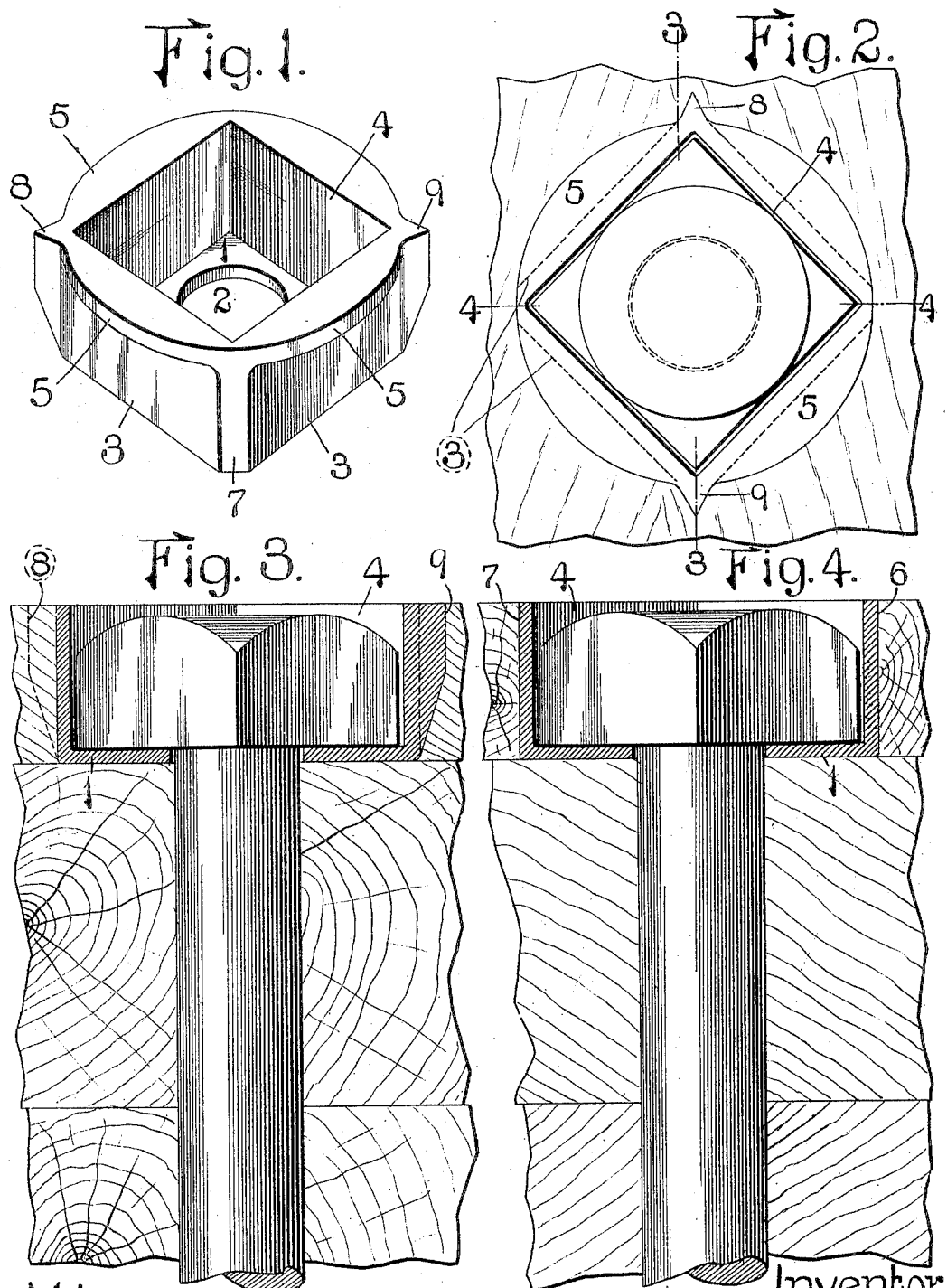

CHARLES G. ETTE, OF ST. LOUIS, MISSOURI.

SOCKET-WASHER.

No. 797,545.	Specification of Letters Patent.	Patented Aug. 15, 1905.

Application filed April 17, 1905. Serial No. 256,172.

*To all whom it may concern:*

Be it known that I, CHARLES G. ETTE, a citizen of the United States, residing at St. Louis, Missouri, have invented a certain new and useful Improvement in Socket-Washers, of which the following is a full, clear, and exact description, such as will enable others skilled in the art to which it appertains to make and use the same, reference being had to the accompanying drawings, forming part of this specification, in which—

Figure 1 is a perspective view of a washer constructed in accordance with my invention. Fig. 2 is a fragmentary view of a wooden support showing my washer applied. Fig. 3 is a sectional view on the line 3 3 of Fig. 2; and Fig. 4 is a sectional view on the line 4 4 of Fig. 2.

This invention relates to the class of washers, but particularly to what might be termed a "socket-washer," in that it is contemplated to countersink the washer in a recess in a board, joist, or similar element which it is desired to secure in place.

In the construction of walls, staging, bridges, and trestles it is sometimes desirable to utilize heavy stay-bolts, and if the heads of the bolts were permitted to project above the surface of the floor they would not only be unsightly, but inconvenience would be caused on account of the uneven surface resulting on account of their location.

It is the purpose of my invention to provide a washer which may be countersunk or recessed in a board, joist, or similar element, so that the head of the bolt may fit in the washer, whereby the end of the bolt-head will not project above the surface of the element which it secures. In order to combine strength with lightness, I prefer to construct the washer in the form of a malleable casting, the respective walls of which are preferably of the same sectional area throughout. By this means I not only provide a tough strong washer which cannot be easily broken, but I also provide a washer which is inexpensive to produce.

The construction of the preferred form of socket-washer consists of a bottom portion 1, having a bolt-opening 2 therein. The bottom portion is preferably polygonal. Projecting from the base are a plurality of side walls 3, corresponding in number to the number of edges on the base. In the present instance I have illustrated the base as being rectangular and as having four side walls 3, so as to form a rectangular socket or recess 4.

5 designates a plurality of outwardly-disposed lips or flanges carried by the respective free edges of the side walls, all of the lips or flanges being struck on the same arc, so as to form a circular flange designed to be of the same diameter as the diameter of the recess drilled in the wood, and the edges of the diametrically opposite corners 6 and 7 of the washer are curved on the same arc as the circular flange, whereby these corners will rest against the wall of the recess when the socket is in place.

8 and 9 designate diametrically opposite wings which are formed with knife-edges and which are inclined from the bottom portion in an outward direction toward the opposite portion, so that when the washer is introduced into the socket and forced thereinto the wings will engage in the solid wood, so as to prevent turning of the washer in the socket in which it is placed.

From the foregoing description it will be obvious that a recess may be drilled in the wood of approximately the same diameter as the diameter of the flange on the washer. Thus the washer may be inserted in the recess, so that the outside surface of the flange will be practically flush with the wood. In view of the fact that the corners of the washers bear against the wall of the recess and the wings engage the wood beyond the edge of the recess it will be practically impossible to turn the washer or the bolt held thereby. It will therefore be seen that the washer will be held rigid in the socket, and in view of the fact that it completely receives the bolt-head the disadvantages resulting from a projecting head from the surface of the wood will be avoided.

Having thus described my invention, what I claim as new, and desire to secure by Letters Patent, is—

1. As a new article of manufacture, a socket-washer comprising a bottom web having an opening, outstanding flanges carried by the web and joined together to form sides, an outstanding flange surrounding the free edges of the sides, and wings projecting outwardly from the walls of the washer; substantially as described.

2. A socket-washer comprising a bottom web having a bolt-opening, four sides connected to the bottom and to each other, an outstanding flange connected to the free edge of the sides, and oppositely-disposed wings arranged at the corners formed by the sides; substantially as described.

3. A socket-washer having a bottom, sides carried by the bottom, and at right angles thereto, and an approximately circular flange carried by the free edges of the sides and at right angles thereto, the diameter of the flange being not greater than the diagonal of the washer, the outer wall formed by the sides being polygonal to prevent turning of the washer when in its socket, and the inner wall formed by the sides being polygonal to prevent rotation of a nut or bolt contained therein; substantially as described.

4. A rectangular socket-washer having a bottom with a bolt-opening, and a flange approximately circular in plan, the diameter of the flange being not greater than the diagonals of the rectangular washer, and wings carried by the said washer; substantially as described.

In testimony whereof I hereunto affix my signature, in the presence of two witnesses, this 12th day of April, 1905.

CHARLES G. ETTE.

Witnesses:
EDW. P. KYLE,
EDW. SCHNEIDDE.